US005595217A

United States Patent [19]
Gillen et al.

[11] Patent Number: 5,595,217
[45] Date of Patent: Jan. 21, 1997

[54] DRY BREAK COUPLING ASSEMBLY WITH CAM-LOCKING CONNECTION SYSTEM

[75] Inventors: Mark E. Gillen; Stephen L. Biggs, both of Crawfordsville, Ind.

[73] Assignee: Banjo Corporation, Crawfordsville, Ind.

[21] Appl. No.: 435,795

[22] Filed: May 5, 1995

[51] Int. Cl.$^6$ ........................................................ F16L 37/28
[52] U.S. Cl. .......................... 137/614.06; 251/149.9; 251/111
[58] Field of Search .......................... 137/614.06, 614.01, 137/637.05, 614.02; 251/149.9, 95, 96, 111

[56] References Cited

U.S. PATENT DOCUMENTS

| | | |
|---|---|---|
| 2,440,946 | 5/1948 | Hansen . |
| 2,872,216 | 2/1959 | Kaiser ................................ 137/637.05 |
| 3,473,569 | 10/1969 | Guertin et al. . |
| 3,664,634 | 5/1972 | Guertin et al. .................. 137/614.06 X |
| 4,392,513 | 7/1983 | Parrish ............................ 137/614.02 X |
| 4,438,779 | 3/1984 | Allread . |
| 4,664,149 | 5/1987 | Fremy . |
| 5,090,448 | 2/1992 | Truchet . |
| 5,095,946 | 3/1992 | McLennan . |
| 5,284,182 | 2/1994 | McLennan . |
| 5,332,001 | 7/1994 | Brown ................................ 137/614.06 |

OTHER PUBLICATIONS

BANJO, Liquid Handling Products brochure, 1993.
Procurement Specifications MIL-C-27487, Military Standard 27019, Coupling Assembly, Quick Disconnect, Cam--Locking Type.
Victaulic, Dry Disconnect Device Operating Instructions, 1991.
Victaulic, Dry Link brochure, 1992.
Fill-Rite, Surestop Dry Disconnect Parts and Technical Service Guide.
Pfannenschmidt GmbH, Ball-Valve-Couplings brochure.

*Primary Examiner*—Kevin Lee
*Attorney, Agent, or Firm*—Baker & Daniels

[57] ABSTRACT

A dry break coupling assembly for interconnecting components of a fluid handling system. The coupling assembly includes first and second valves which each include a rotatable valve element for opening and closing a fluid passageway within a valve body. The valve elements are cooperatively structured such that a portion of one valve element fits within a recess in the other valve element when the valves are connected, thereby reducing any space between the valves in which fluid could collect and spill from when the valves are disconnected. The first valve includes camming levers pivotally mounted to the body. The second valve includes locking fingers disposed on the body that are engaged by the camming levers when the first and second valves are connected and the camming levers pivot to the locking position, whereby the valves are locked together. The present invention provides a mechanism for engaging the camming levers when the valves are opened to prevent inadvertent disconnection of the valves. The present invention also provides a locking assembly which prevents the valve handles from rotating and opening the valves when the valves are not connected.

20 Claims, 6 Drawing Sheets

DRY BREAK COUPLING ASSEMBLY WITH CAM-LOCKING CONNECTION SYSTEM

BACKGROUND OF THE INVENTION

The present invention pertains to a coupling assembly for components of a fluid handling system, and, in particular, to a dry break coupling assembly which has a minimal tendency to spill conveyed fluid when disconnected.

Coupling assemblies are utilized to provide ready connection and disconnection of multiple components, such as separate hoses or a hose and a tank, of a fluid handling system. In many situations, the fluid being conveyed or retained within the fluid-handling system is potentially harmful to the environment or to the user of the coupling assembly. Such fluids include pesticides, fertilizers, gasoline or flammable fluids, and a variety of toxic substances. The coupling assemblies preferably utilized with such liquids are known as dry disconnect or dry break coupling assemblies and can be connected and disconnected with minimal or zero fluid spillage.

A variety of different types of dry disconnect coupling assemblies are already known in the art. One type of dry break coupling includes spring biased popper valves mounted in the separate coupling halves. These poppet valves are opened and closed to control fluid flow through the coupling assembly by a plunger axially shiftable within one of the coupling halves. One disadvantage of this coupling configuration is an appreciable pressure drop over the length of the coupling results from the presence of the valve elements interposed within the flow path of the fluid.

Another type of dry disconnect coupling device, such as disclosed in U.S. Pat. No. 4,664,149, is automatically opened and closed when the separate coupling halves of the coupling are connected and then disconnected. While useful in some applications, these devices are complicated in design and manufacture, which may undesirably increase their cost. Furthermore, these devices may be inconvenient to use in situations where selective control or stoppage of the fluid flow during liquid transfer is desirable.

Other types of dry disconnect coupling assemblies, such as disclosed in U.S. Pat. No. 2,440,946, utilize two interfitting rotary valve elements such as ball valves. While functional to provide a dry disconnect, known devices of this type are not without their shortcomings. In some prior art designs, the mechanical linkage by which the separate coupling halves can be connected, or the manner in which the sequencing of the opening and closing of the valves is controlled, is not especially user friendly or intuitive to a user. For example, some valves require that the separate valves first be axially shifted together and then rotated relative to one another such that the camming members on one of the valves engages complementary elements on the other valve. The operation of this connection system may be confusing to some users who need to experiment to determine which way the valves need to be rotated to effect connection and subsequent disconnection. In addition, in some valves an absent-minded user can accidentally turn on the valves when they are disconnected and an unfortunate spill of potentially harmful fluids may occur.

Thus, it would be desirable to provide a dry break coupling assembly which overcomes shortcomings of these and other prior art systems.

SUMMARY OF THE INVENTION

The present invention provides a dry break coupling assembly which allows hoses and other components of a liquid handling system to be connected together in a convenient, user-friendly fashion and with minimal likelihood of spillage during their subsequent disconnection. A locking mechanism is provided which prevents the valves of the coupling assembly from being disconnected from one another when the valves are open. The present invention further provides a locking assembly that prevents the valve handles from being accidentally rotated to open the valves when the valves are not connected together.

In one form thereof, the present invention provides a dry break coupling assembly for interconnecting and controlling fluid flow between first and second components in a fluid handling system. The coupling assembly includes a first valve which is attachable to the first fluid handling system component and which includes a body, a valve element rotatably supported within the body, and a handle operatively connected to the valve element for selectively rotating the valve element between an open position, wherein a fluid passageway in the body is opened, and a closed position, wherein the fluid passageway is closed. The first valve also includes at least one camming lever pivotally mounted to the body and pivotable between a release position and a locking position. The coupling assembly also includes a second valve which is attachable to the second fluid handling system component and which includes a body, a valve element rotatably supported within the body, and a handle operatively connected to the valve element for selectively rotating the valve element between an open position, wherein a fluid passageway in the body is opened, and a closed position, wherein the fluid passageway is closed. The second valve also includes at least one locking component disposed on the body for cooperating with the camming lever. The first and second valves are movable relative to each other between a disconnected arrangement and a connected arrangement, and valve connection ends of the bodies of the first and second valves are disposed in facing relationship when the first and second valves are connected. The valve element of one of the valves includes a recess arranged to face the valve element of the other valve when the valves are connected and the valve element is disposed in the closed position. This recess moves out of facing relationship with the other valve element when the valve element with the recess rotates from the closed position. The valve element of the other valve includes a portion conforming to the shape of the valve element recess that nests within the valve element recess when the valves are connected and the valve elements are disposed in their closed positions. The camming lever and the locking component are complementarily structured and arranged such that the camming lever engages the locking component when the first and second valves are connected and the camming lever pivots from the release position to the locking position, whereby the valves are locked together in their connected arrangement so as to permit fluid flow therethrough when the valve elements of the valves are disposed in their open positions.

In another form thereof, the present invention provides a coupling assembly for interconnecting and controlling fluid flow between first and second components in a fluid handling system. The coupling assembly includes a first valve attachable to the first fluid handling system component, and a second valve attachable to the second fluid handling system and connectable to the first valve. Each of the first and second valves includes a body including a fluid passageway and a valve connection end, a valve element rotatably supported within the body and rotatable between a closed position closing the fluid passageway and an open position opening the fluid passageway, wherein at least a majority portion of the valve element is located in a rearward direction from its respective valve connection end, and a handle operatively connected to the valve element for selectively rotating the valve element between its open position and closed position. The handle is disposed in a first position when the valve element is arranged in the closed position and a second position when the valve element is arranged in the open position. At least one of the first and second valves includes an automatic locking assembly for preventing rotation of its respective handle from the first position toward the second position when the valves are disconnected and for permitting rotation of its respective handle from the first position toward the second position when the valves are connected. The locking assembly includes a locking component slidably disposed relative to the body and movable between a forward position and a rearward position, and a biasing element for biasing the locking component toward the forward position when the valves are disconnected. The locking component is complementarily configured with the other valve to be engaged thereby during connection of the valves such that the locking component is forced rearwardly to the rearward position during valve connection. The locking assembly also includes a handle engaging member connected to the locking component, and a recess formed in the handle. The handle engaging member is structured and arranged to be in abutting contact with a portion of the handle arranged in the first position when the locking component is disposed in the forward position such that rotation of the handle relative to the locking component is prevented, and the handle engaging member is aligned with the handle recess when the locking component is disposed in the rearward position such that the handle may rotate from the first position toward the second position as the handle engaging member slides within the recess.

One advantage of the dry break coupling assembly of the present invention is that its mating valves may be connected and disconnected in an uncomplicated and intuitive fashion that is convenient for a user.

Another advantage of the dry break coupling assembly of the present invention is that the valves cannot be accidentally opened while disconnected from each other.

Still another advantage of the present invention is that it provides a locking mechanism for the camming levers used to connect together the valves of the assembly that is automatically actuated when the valves are opened, and consequently inadvertent disconnection of the valves when opened is prevented.

Still another advantage of the present invention is that the handles are constructed such that their sequence of operation during use is substantially intuitive to a user.

Still another advantage of the present invention is that the camming levers and profile inserts can be replaced if damaged without removing the valves from the components of the liquid handling system to which they are attached.

BRIEF DESCRIPTION OF THE DRAWINGS

The above mentioned and other advantages and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent an embodiment of the invention, the drawings are not necessarily to scale and certain features may be exaggerated or omitted in order to better illustrate and explain the present invention.

DESCRIPTION OF THE PREFERRED EMBODIMENT

Figure 1:
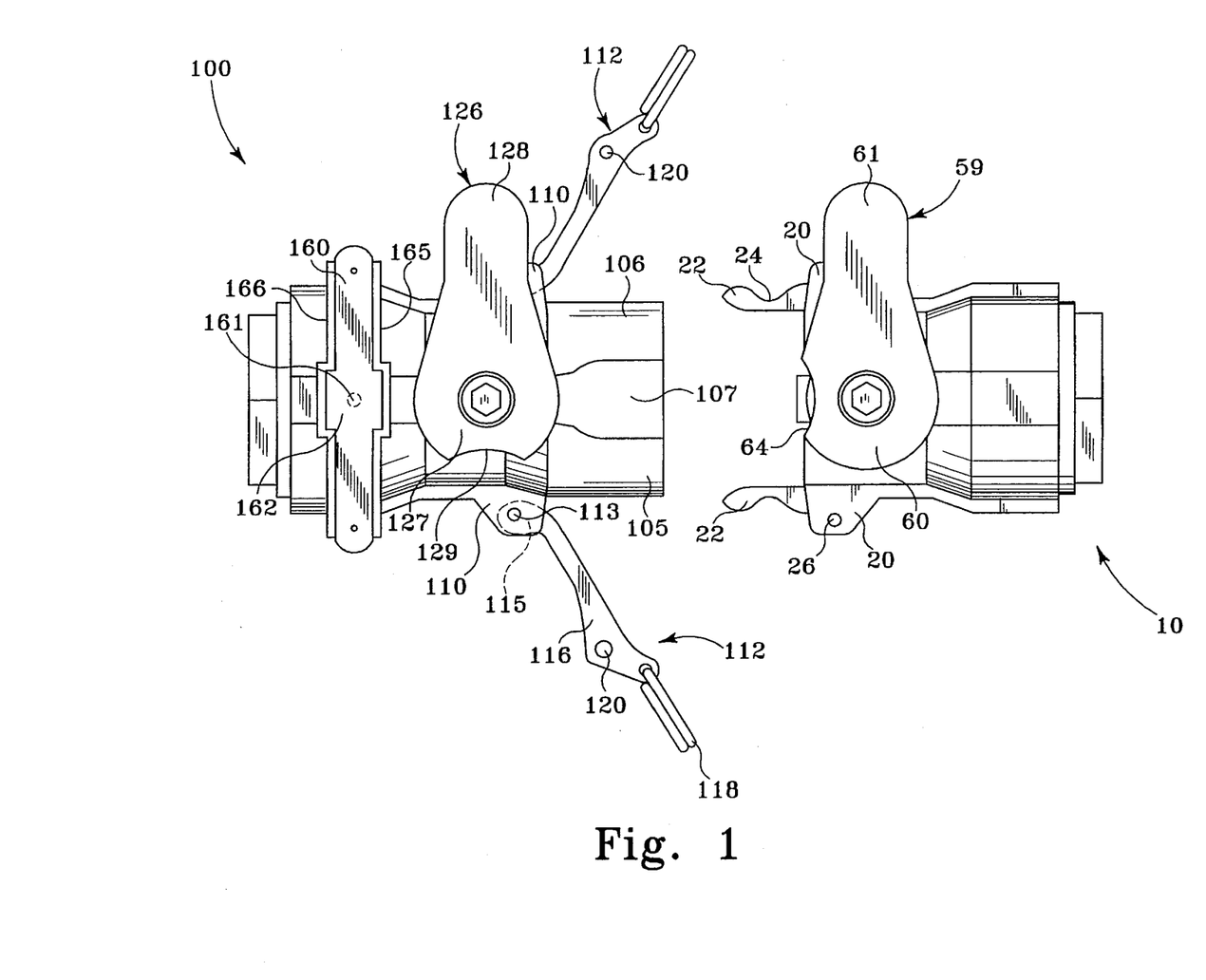
FIG. 1 is a plan view of an embodiment of the dry break coupling assembly of the present invention, wherein the male valve and female valve of the assembly are disconnected and in an axially spaced apart relationship.

Referring now to FIG. 1, there is shown a top view of a preferred embodiment of the dry break coupling assembly of the present invention. The coupling includes a pair of cooperating valves, generally designated 10 and 100, which are shown disconnected from one another and in an axially aligned, spaced apart relationship. When so disconnected, the valves are closed to prevent fluid from spilling out therefrom, and the shown transverse orientation of the valve handles 59, 126 relative to the valve bodies is a conventional, visible indication to a user of the valves being closed.

The valves of the coupling assembly can be mounted to separate components of a liquid handling system, and can then be connected together to provide a convenient, fluid-tight communication between the components. The valves further allow for quick component disconnect. Consequently, valves 10, 100 may advantageously be attached via their provided fittings described below to separate hoses or system tanks (not shown) which are to be coupled together and then decoupled at various times during their use. In the shown embodiment, valves 10 and 100 respectively include male and female type constructions that cooperate to facilitate a proper rotational and axial alignment of the valves during their interconnection. While this male/female configuration is intended to assist the user in operating the valves, it is not required to practice the present invention.

The coupling assembly is designed and manufactured to provide a dry break connection, which refers to the valves having a minimal if not zero tendency to drip or spill fluid when disconnected from a connected, fluid conveying arrangement. The coupling assembly is therefore particularly suited for liquid handling systems utilized with fluid materials for which accidental spillage or drippage should be kept to a minimum, such as with pesticides or fertilizers, flammable materials, chemicals or toxic substances.

Figure 2:
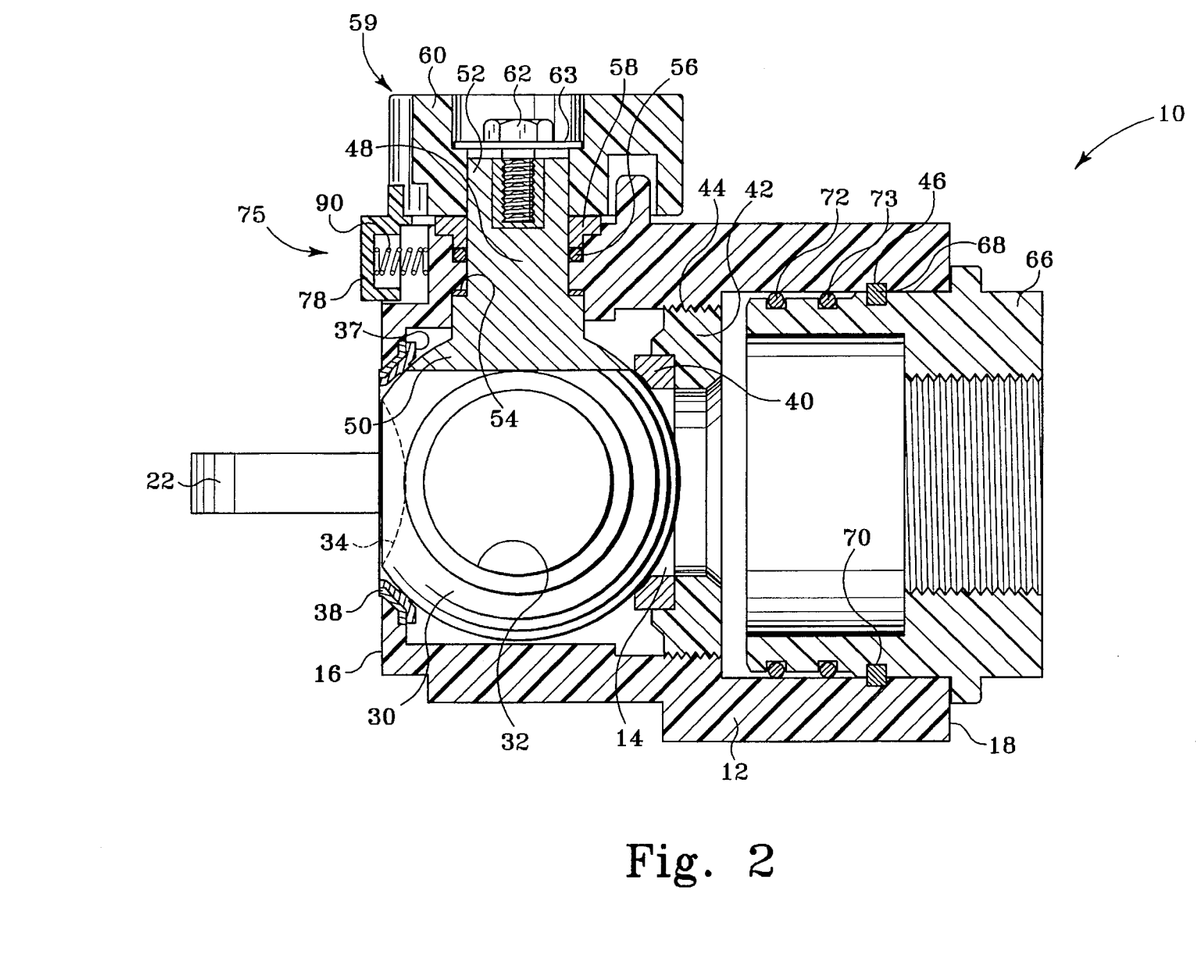
FIG. 2 is a side view in partial cross-section of the male valve of FIG. 1.

Referring also to FIG. 2, which shows male valve 10 separate from female valve 100 and in partially sectioned side view, male valve 10 includes a generally tubular body 12 with an interior cavity or fluid passageway 14 that longitudinally or axially extends from a forward, valve connection end 16 which is generally planar in this embodiment to a rearward, conduit fitting end 18. As used herein, forward and rearward are individually referenced for each valve, and the forward direction refers to the axial direction in which a given valve is moved toward a cooperating valve for fluid conveying interconnection therewith. The rearward direction similarly refers to the axial direction in which a given valve is pulled away from a cooperating valve, for example during disconnection of valves 10, 100.

Body 12 is molded from fiberglass reinforced polypropylene to provide both high strength and durability. Other materials of construction for the body, including stainless steel, may alternatively be employed. As best shown in FIG. 1, two pair of radially projecting ears 20 which are spaced approximately 180° apart around the body circumference are integrally formed with body 12. Separate profile inserts or cammed fingers 22 with outwardly facing, radiused recesses 24 are fixedly held within ears 20 via retaining pins 26 and forwardly project beyond valve connection end 16. In the shown embodiment, pins 26 extend through inserts 22 and friction fit with bores in ears 20. Profile inserts 22 are formed of high strength stainless steel to provide for a rigid and secure connection with the camming members of the female valve as described below.

Rotatably supported within interior cavity 14 is a valve element 30 which may be rotated to open and close valve 10 to control the flow of fluid through body cavity 14. In this embodiment, valve element 30 is a ball type element which is generally spherical in shape and made of a plastic material, such as polypropylene. Ball valve 30 includes a diametrical, cylindrical bore 32 and a concave recess 34 which is perpendicularly disposed relative to bore 32. When valve handle 59 is oriented in its closed position as shown in FIGS. 1 and 2, bore 32 is transversely oriented, and recess 34 is centered within the opening into body cavity 14 at valve connection end 16 and faces forward toward the female valve 100 engagable with male valve 10. To aid in preventing fluid flow past a closed ball valve 30, a pair of annular seals 37, 38 are provided on the valve connection side of ball valve 30 and another annular seal 40 in provided on the conduit fitting side of ball valve 30. Seal 37, which is made of Teflon™ but could be constructed of other sealing materials known in the art, sealingly engages the exterior surface of ball valve 30. Seal 38, which may be made of Viton™, is sandwiched between seal 37 and an annular, internal shoulder of body 12 and axially projects forward of the surface of valve connection end 16. Ring-shaped Teflon™ seal 40 is seated on a retaining disk 42 having an axial throughbore. Retaining disk 42 is externally threaded and engages an internally threaded section 44 of body 12. It will be appreciated that disk 42 can be screwed into body cavity 14 during assembly of valve 10 with sufficient force such that the various seals are properly seated and in engagement with the ball valve and each other to provide fluid tight seals around ball valve 30.

Ball valve 30 is rotationally fixed with stem 48, which upwardly extends from ball valve 30 through a transverse bore provided in body 14. A keyed lower end 50 of stem 48 is nested within a groove provided in ball 30 such that rotation of stem 48 is transferred to ball valve 30. The upper end 52 of stem 48 is shaped to fit within a keyed hole in the head 60 of handle 59 to be rotationally fixed therewith. Handle 59 also includes a manually graspable torque arm 61 which allows easier operation of the valve. Screw 62 engages an internally threaded metal plug within stem upper end 52 and cooperates with washer 63 to keep handle 59 secured to stem 48. Annular bearing 54 is made of Teflon™ and facilitates rotation of stem 48. Stem O-ring 56, which furnishes a fluid-tight seal around stem 48 to prevent fluid from escaping from cavity 14, is held in position by bushing 58 that contacts the underside of handle head 60.

As best shown in FIG. 1, handle head 60 includes a concave recess designated 64. Recess 64 is structured complementary to female valve handle 126 and arranged on handle 59 to properly sequence the operation of the valve handles as described further below.

A fitting permitting connection to a component of a liquid handling system is provided for male valve 10 opposite the forward end to which female valve 100 connects. In the shown embodiment, a female threaded fitting, generally designated 66, is provided. Fitting 66 is a swivel type fitting which is free to rotate within body 14 but axially fixed relative to body 14. The ability of this fitting to rotate relative to body 14 facilitates in many situations the connection of male valve 10 to the male threads of a fitting on a liquid handling system component. A Teflon™ strip or spline 68 fits into a groove 70 that circumscribes fitting 66 and projects into a ring-shaped groove 46 along the interior surface of body 14 to axially lock fitting 66. Spline 68 is inserted through a plugged access hole (not shown) through body 12 that opens into body groove 46. A pair of O-rings 72, 73 circumscribe fitting 66 to provide a fluid tight seal between fitting 66 and body 12. It will be appreciated that the shown fitting is merely one type suitable for use with male valve 10 and others may be substituted within the scope of the invention. For example, the body and fitting could be integrally formed. Moreover, differently sized and shaped fittings could be substituted.

To prevent handle 59 from being rotated from a closed position to an open position when male valve 10 is not connected to a female valve 100 and thereby allowing fluid to spill out from the valve, a handle locking assembly generally designated 75 is preferably provided. As best shown in an exploded perspective view of FIG. 3, locking assembly 75 includes a locking button 78 which when assembled inserts into hollow 85 formed in the top of valve body 12. When installed, cap section 79 overlays the upper faces of the walls 86 that define hollow 85. Locking button 78 is biased forward within hollow 85 by a biasing element, for example spring 90 shown, such that boss 80 extends through hollow access slot 88 and projects forward of valve connection end 16 as shown in FIG. 2. Vertical stop flanges 82 laterally extend from either side of boss 80 and engage inwardly directed lips 89 at the forward reach of hollow 85 to retain locking button 78 within hollow 85. Upwardly projecting from cap section 79 is a handle engaging member 83. While the preferred arcuate ridge shape is shown, other configurations of member 83 which project from cap 79 may be employed.

Figure 3:
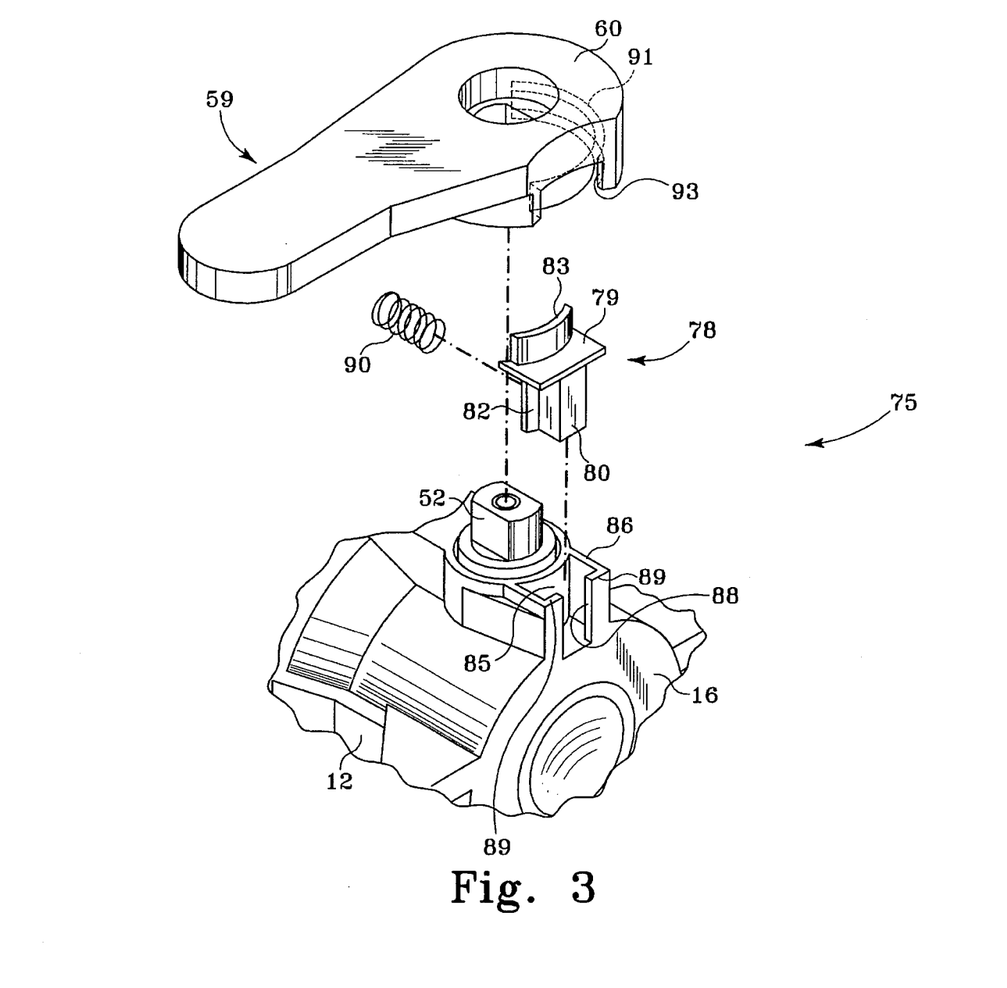
FIG. 3 is an exploded, fragmentary perspective view of selected portions of the male valve of FIG. 1 showing the locking assembly which prevents inadvertent valve handle rotation when the valves of the coupling assembly are not operatively connected.

When the exploded components of FIG. 3 are assembled and handle 59 is disposed in the closed position shown, spring 90 biases locking button 78 forward until stop flanges 82 abut hollow lips 89. When so arranged, handle rotation, and therefore opening of valve element 30, is prevented as the end of arcuate ridge 83 abuts a stop element, such as surface 93, of handle head 60. When button 78 is compelled rearwardly, such as by contact with a portion of female valve 100 during connection of valves 10, 100, and preferably by contact with a locking button of a similar locking assembly on female valve 100, ridge 83 is shifted rearward into an arcuate recess or groove 91 shown in shadow formed into the underside of handle head 60. The alignment of ridge 83 within groove 91 allows handle 59 to be rotated, and groove 91 is sized to permit handle 59 to be rotated approximately 90° to an open position where it is in axial alignment with body 12.

Figure 4:
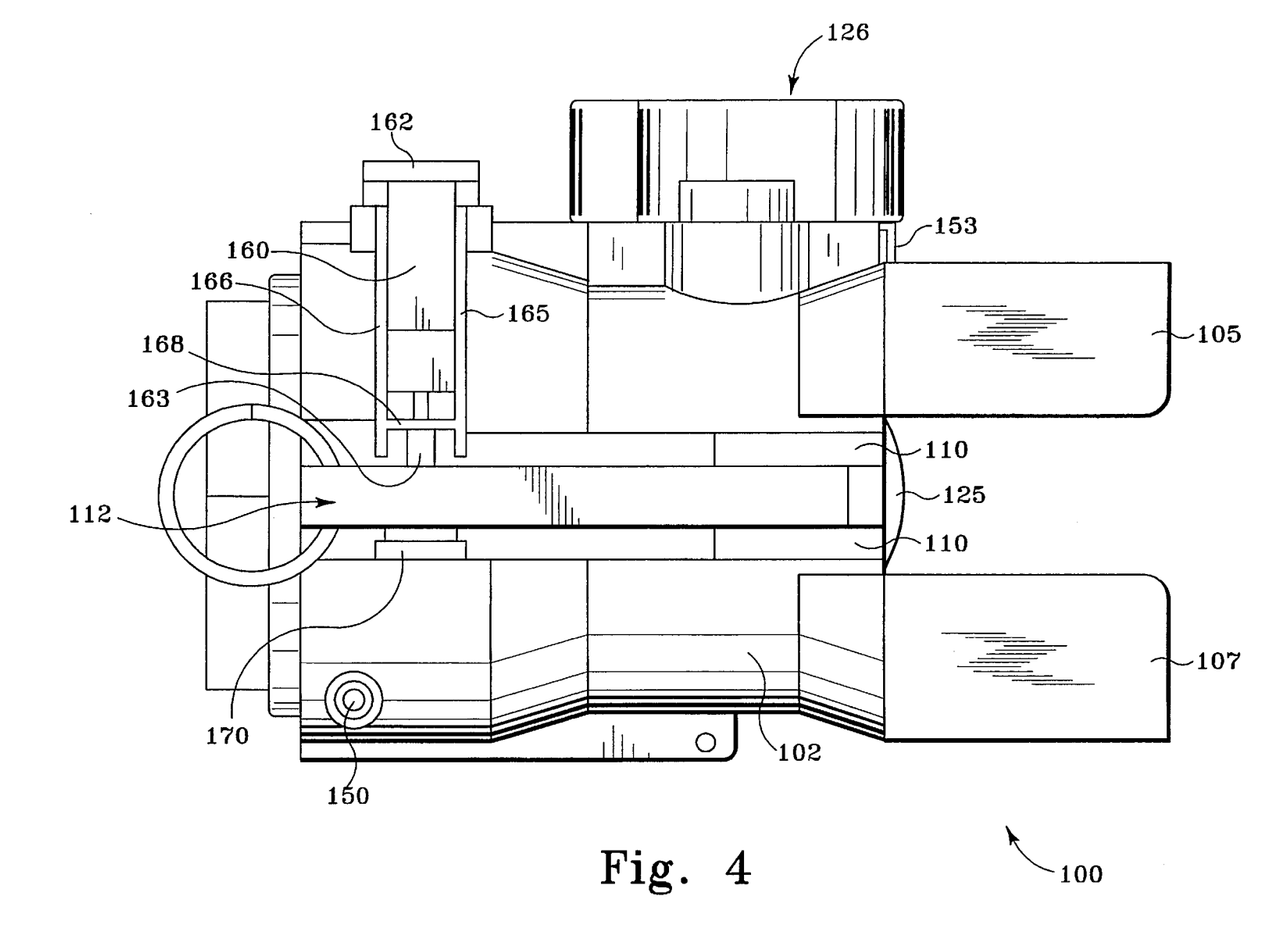
FIG. 4 is a side view of the female valve of FIG. 1 wherein the camming levers have been shifted to a locking or camming position.
Figure 5:
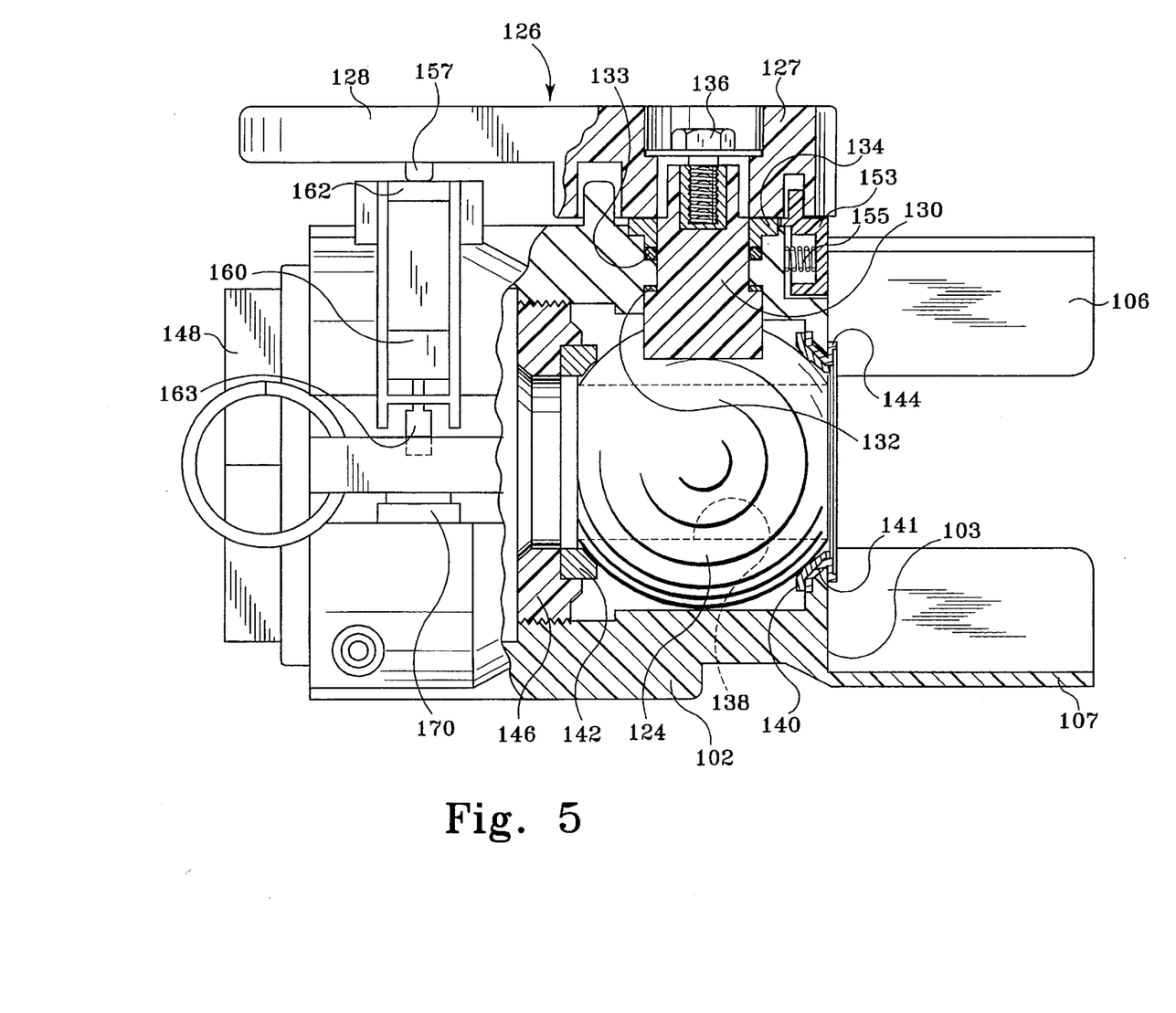
FIG. 5 is a side view in partial cross-section of the female valve of FIG. 4 wherein the valve handle has been shifted to an open position to open the valve and simultaneously cause locking pins of a yoke assembly to engage the camming levers to prevent inadvertent disconnection of the coupling assembly valves while the valves remain open.

Referring now to FIGS. 1, 4 and 5, the preferred construction of female valve 100, which will be appreciated by those of skill in the art to be similar in many respect to male valve 10, will be further described. FIG. 4 is a side view of female valve 100 of FIG. 1 with valve handle 126 still disposed in a closed position but with a pair of camming levers, generally designated 112, shifted to the closed position assumed upon cam locking female valve 100 together with male valve 10. FIG. 5 is a partial sectional view of female valve 100 of FIG. 4 after the valve handle is rotated to an open position to simultaneously open the internal valve element and actuate the camming lever locking assembly.

Valve body 102 is molded from fiberglass reinforced polypropylene with a generally cylindrical shape and an interior cavity in which the rotatable valve element is disposed. Integrally formed with body 102 and projecting forwardly therefrom is a valve alignment collar formed of three curved tabs 105, 106 and 107. Tabs 105–107 are shaped complementarily to male valve 10 so as to closely fit over the exterior surface of male valve body 12 when the forward portion of male valve 10 inserts therein during valve connection. The gaps between the facing edges of tabs 105, 107 and tabs 106, 107 allow passage of ears 20 such that profile inserts 22 are inserted in the space between body 102 and camming levers 112 so as to be aligned for engagement with levers 112. The gap between tabs 105 and 106 is sized and arranged to fit around the portion of male valve body 12 upon which handle 59 is located. It will be recognized that the tab gaps serve as keys preventing an improper relative rotational orientation of valves 10, 100 during valve connection. Pairs of ears 110 radially project from opposite sides of body 102 and pivotally mount the camming levers 112, with retaining pins 113.

Camming levers 112 are cooperatively designed with profile inserts 22 to achieve a locking engagement when valves 10, 100 are axially moved into a connected arrangement and camming levers 112 are pivoted rearward about pins 113 to a position against body 102. As shown in shadow in FIG. 1, camming levers 112 each include a camming lobe 115 and a camming arm 116 extending therefrom. Pull rings 118 connected to the outer ends of camming arms 116 make it easier for a user to pull and thereby shift the camming levers from a locking position shown in FIG. 4. Locking recesses 120 in camming arms 116, such as holes therethrough, are engagable with the camming lever locking assembly described further below.

Pivot pins 113 are offset within camming lobe 115 such that camming lobes 115 project into and engage recesses 24 of profile inserts 22 when camming arms 116 are pivoted rearward against body 102. When lobes 115 engage profile inserts 22, male valve 10 is axially pulled into a closer relationship with female valve 100 and is held or locked thereat. Complementary shapes of camming levers 112 and profile inserts 22 other than the configuration shown may naturally be substituted if desired.

As shown in FIG. 5, ball valve element 124 within the interior cavity of valve body 102 is rotationally fixed to handle 126 by keyed stem 130. When valve element 124 is closed as shown in FIG. 4, a forward, spherical portion 125 projects forward beyond a planar valve connection end 103. Spherical portion 125 is contoured to nest within concave recess 34 of ball valve 30 with minimal and preferably no clearance when valves 10, 100 are connected. Valve element 124 includes a diametrical bore 138 which is axially aligned as shown in FIG. 5 when handle 126 is twisted to an open condition such that fluid may flow through female valve 100.

Stem 130 is circumscribed by bearing 132, O-ring 133, and bushing 134 and connected to handle 126 with screw 136. Seals 140, 141 and 142 disposed on the forward and rearward portions of valve element 124 provide a fluid tight seal around the valve element. Unlike its counterpart in male valve 10, seal 141 includes a lip 144 that overlays the forwardly facing surface of valve connection end 103. Lip 144 sealingly contacts the face of valve connection end 16 of male valve 10 to provide a fluid tight seal around the mating elements at the interface of the valves connection ends. Seal 142 is seated on retaining disk 146. A swivel fitting 148 similar to male valve fitting 66 attaches to body 102 with a not shown spline inserted through a hole in body 102 covered by a threaded plug 150 shown in FIG. 4.

The locking assembly for preventing rotation of handle 126 is constructed similar to handle locking assembly 75, and differs only in that the handle engaging member is not readily visible when the handle is closed as the member fits entirely within a space molded into the underside of the handle.

The locking assembly includes a locking button 153 biased forwardly within a body hollow by spring 155. As shown in the side view of FIG. 4, locking button 153 projects forward of valve connection end 103 when handle 126 is in the closed position. An arcuate ridge (not shown) projecting upwardly from locking button 153 fits within a cavity (not shown), formed into the underside of handle head 127, when the handle is in the closed position. The cavity is angularly coextensive with the arcuate ridge, and the generally radially arranged side walls that define the cavity engage the sides of the arcuate ridge to prevent handle rotation. An arcuate groove (not shown) similar to groove 91 is formed in the underside of handle 126 and is radially inward of the arcuate cavity. When locking button 153 is forced rearwardly, the arcuate ridge is moved into the groove and handle 126 can subsequently be rotated through an angle of about 90° until the end of the groove reaches the arcuate ridge of locking button 153.

It will be appreciated that in FIG. 5 the arcuate ridge resides within the handle groove as the handle is disposed in the open position. In view of the foregoing, it will further be appreciated that in order to rotate handle 126 from the closed position shown in FIG. 4 to the open position shown in FIG. 5 while the valves are not connected, a user needs to manually force and hold locking button 153 rearwardly against the returning force of spring 155 in the position shown in FIG. 5 and then rotate handle 126 to avoid having the arcuate ridge projecting from locking button 153 abut the handle cavity walls and thereby prevent handle rotation.

As best shown in FIG. 1, handle 126 includes a head 127 and a torque arm 128. Handle head 127 includes a concave recess 129 that is complementarily structured relative to male valve handle 59 and arranged on handle 126 to properly sequence valve handle operation.

To prevent a user from disconnecting male and female valves 10, 100 when either of their respective valve elements are in the open position, a locking mechanism for camming levers 112 is provided. The locking mechanism includes a yoke assembly which fits over and closely conforms to the general profile of valve body 102. The yoke assembly includes a generally C-shaped yoke 160 that includes a boss 162 at a mid-point of its length. Boss 162 is disposed at the top of body 102 and is designed to engage a cam 157 provided on the underside of handle arm 128. A spring or similar functioning biasing member 161 (See FIG. 1) is mounted between body 102 and boss 162 and serves to bias yoke 160 away from body 102. At either end, yoke 160 mounts in a friction fit locking elements, such as pins 163, that downwardly project through holes through stop ribs 168 integrally formed with valve body 102. Other locking members cooperatively designed with the camming levers to prevent the camming levers from pivoting forward may be substituted within the scope of the invention.

The lower ends of pins 163 are larger than the holes in ribs 168 such that once assembled to yoke 160, pins 163 limit the distance which the spring can force yoke 160 upward. When yoke 160 is spring biased upward, pins 163 are partially withdrawn upwardly such that camming levers 112 can be shifted to a locked position shown in FIG. 4 with camming arms 116 positioned between pins 163 and support tabs 170. When handle cam 157 engages boss 162 to force yoke 160 downward, pins 163 are shifted downward to extend into locking recesses 120 in camming arms 116 as shown in FIG. 5. When inserted within recesses 120, pins 163 prevent camming levers 112 from being pivoted open and thereby prevent valve disconnection. Guide ribs 165, 166 flank the forward and rearward sides of yoke 160 to support yoke 160 in a proper alignment.

The structure of the coupling assembly of the present invention will be further understood in view of the following explanation of its use to couple together and then decouple components of a fluid handling system. In FIG. 1, valves 10 and 100 are shown disconnected and without the fluid handling system components to which they are releasably attached with their provided fittings. When the valves are not connected, handles 59 and 126 are each disposed in the shown transverse position such that the valves are closed to prevent spillage of fluid. The locking assemblies including the forwardly-biased locking buttons 78, 153 prevent their respective valve handles from being accidentally moved to an open position which would allow fluid to spill from the disconnected valves. Camming levers 112 are forwardly angled as shown in FIG. 1 in preparation for the insertion of profile inserts 22.

Male valve 10 and female valve 100 are then axially moved together such that male valve 10 inserts into the alignment collar formed by tabs 105–107 of female valve 100. The mated valves are further moved together until the seals at their respective valve connection ends abut. When the valves are so arranged, spherical portion 125 of rotatable valve element 124 fits within recess 34 of ball valve 30 element of male valve 10. Little and preferably no clearance is provided between portion 125 and recess 34 such that minimal fluid can collect between the two valves and spill therefrom when the valves are disconnected. The curved exterior of handle head 127 fits within recess 64 of handle 59 to thereby interlock the two valve handles together. Camming levers 112 are then pivoted axially rearward about pins 113 such that camming lobes 115 engage profile inserts 22 inserted between camming levers 112 and valve body 102. Camming levers 112 are fully pivoted to a camming or locking position against valve body 102 to lock valves 10, 100 together.

During the mating together of valves 10, 100, locking buttons 78, 153 of the handle locking assemblies abut each other and are each driven rearwardly within their respective body hollows. This locking button translation forces the handle engaging members of the locking assemblies into the grooves in their respective valve handles, which in turn permits handle rotation. The coupling assembly is now ready for operation to control the fluid flow between the linked handling system components.

Due to the interlocking configuration of the handles, and as visibly apparent to a user, female valve handle 126 must be rotated prior to male valve handle 59. As female valve handle 126 is rotated to a full open position to axially align ball valve bore 138 and open the fluid passageway, cam 157 on the underside of handle arm 128 engages yoke assembly boss 162 and forces yoke 160 downward toward valve body 102 against the upward biasing force of the interposed spring. As yoke 160 shifts downward, locking pins 163 insert through holes 120 of camming arms 116. This locking engagement prevents camming levers 112 from being pivoted forward to a release position, which in turn prevents a user from disconnecting valves 10, 100 when any of the valves are open.

Figure 6:
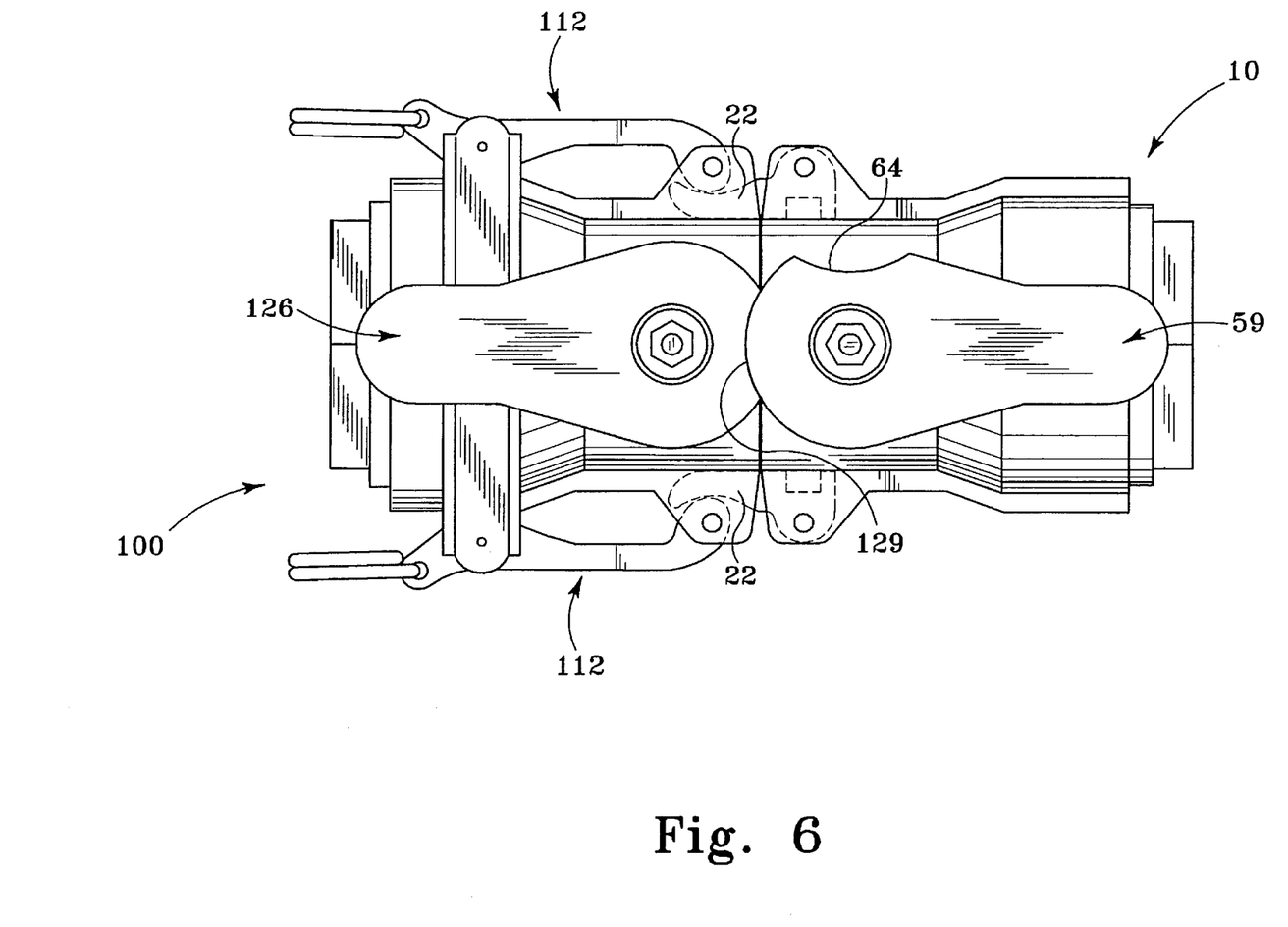
FIG. 6 is a plan view of the dry break coupling assembly of FIG. 1 wherein the male and female valves are connected and the handles of both valves have been rotated to open positions to allow fluid flow through the coupling assembly.

After female valve handle 126 has been rotated, the male valve handle 59 is rotatable as handle recess 129 accommodates the curved exterior of handle head 60. After male valve handle 59 is rotated to rotate ball valve 30 into the full open position, valves 10 and 100 are both open to thereby allow fluid therethrough. At this juncture, valves 10 and 100 are arranged as shown in the plan view of FIG. 6. Due to the interlocking configuration of handles 59, 126, male valve handle 59 must be closed prior to female valve handle 126 being closed.

In order to disconnect the coupling assembly to decouple the handling system components, valve handles 59 and 126 are sequentially rotated about 90° to their closed positions. As valve handle 126 is rotated to a closed position, the handle cam 157 is removed from engagement with boss 162 and yoke 160 is biased upward to retract pins 163 from camming arm holes 120. Camming levers 112 can then be pulled outward and pivoted forward to a disengaged or release position whereat profile inserts 22 are released. When the valves are pulled apart, minimal drippage occurs due to the complementary structure of the valve elements.

While this invention has been described as having multiple designs, the present invention may be further modified within the spirit and scope of this disclosure. For example, for some larger valves, it may be desirable to use additional profile inserts and complementary camming heads on each side of the valves. This application is therefore intended to cover any variations, uses, or adaptations of the invention using its general principles. Further, this application is intended to cover such departures from the present disclosure as come within known or customary practice in the art to which this invention pertains.

What is claimed is:

1. A dry break coupling assembly for interconnecting and controlling fluid flow between first and second components in a fluid handling system, the coupling assembly comprising:

a first valve attachable to the first fluid handling system component, said first valve including:
   a body including a valve connection end, said body further comprising a fluid passageway;
   a valve element rotatably supported within said body, said valve element rotatable between an open position and a closed position;
   a handle operatively connected to said valve element for selectively rotating said valve element between said open position, wherein said fluid passageway is opened, and said closed position, wherein said fluid passageway is closed; and at least one camming lever pivotally mounted to said body, said camming lever pivotable between a release position and a locking position;

a second valve attachable to the second fluid handling system component, said second valve including:

a body including a valve connection end, said body further comprising a fluid passageway;

a valve element rotatably supported within said body, said valve element rotatable between an open position and a closed position;

a handle operatively connected to said valve element for selectively rotating said valve element between said open position, wherein said fluid passageway is opened, and said closed position, wherein said fluid passageway is closed; and at least one locking component disposed on said body for cooperating with said camming lever;

wherein said first valve and said second valve are movable relative to each other between a disconnected arrangement and a connected arrangement, wherein said valve connection ends of said first and second valves are disposed in facing relationship when said first valve and said second valve are disposed in said connected arrangement;

wherein said valve element of one of said first and second valves includes a recess arranged to face said valve element of the other of said first and second valves when said first and second valves are positioned in said connected arrangement and said valve element of said one of said first and second valves is disposed in said closed position, wherein rotation of said valve element of one of said first and second valves from said closed position rotates said recess out of facing relationship with said valve element of the other of said first and second valves;

wherein said valve element of said other of said first and second valves includes a portion conforming to the shape of said valve element recess that nests within said valve element recess when said first and second valves are positioned in said connected arrangement and said valve elements of said first and second valves are disposed in said closed positions;

wherein said camming lever and said locking component are complementarily structured and arranged such that said camming lever engages said locking component when said first and second valves are positioned in said connected arrangement and said camming lever pivots from said release position to said locking position, whereby said first and second valves are locked together in said connected arrangement and permit fluid flow therethrough when said valve elements of said first and second valves are disposed in their open positions; and each of said first and second valves further comprising means for preventing rotation of their respective valve elements from said closed position to said open position when said first and second valves are disposed in said disconnected arrangement, said rotation preventing means of each of said first and second valves structured and arranged for deactivation by operative engagement with the other of said first and second valves when said first and second valves are locked together in said connected arrangement, whereby upon deactivation said rotation preventing means allow rotation of their respective valve elements from said closed position to said open position.

2. The dry break coupling assembly of claim 1 wherein said valve elements comprise ball valve elements with throughbores, wherein said valve element portion comprises a spherical exterior surface portion projecting beyond its respective valve connection end, and wherein said valve element recess comprises a concave shape.

3. The dry break coupling assembly of claim 1 wherein said first valve fluid passageway extends in an axial direction at said valve connection end, wherein said at least one camming lever pivots substantially in said axial direction, wherein said at least one camming lever comprises a camming lobe and a camming arm, wherein said at least one locking component comprises an axially extending locking finger, and wherein said locking finger comprises a recess into which said camming lobe inserts during locking together of said first and second valves.

4. The dry break coupling assembly of claim 3 wherein said locking finger recess faces radially away from said valve body.

5. The dry break coupling assembly of claim 1 wherein said at least one camming lever comprises a pair of camming levers disposed on opposite sides of said first valve body, and wherein said at least one locking component comprises a pair of locking components disposed on opposite sides of said second valve body.

6. The dry break coupling assembly of claim 1 wherein said first valve further comprises a yoke assembly mounted on said body for locking said camming lever in said locking position when said valve element of said first valve is rotated from said closed position to said open position, wherein said yoke assembly comprises a first portion structured to operatively engage and be moved in a first direction by said first valve handle when said valve element of said first valve is rotated from said closed position to said open position, and wherein said yoke assembly comprises a locking member movable in concert with said first portion, wherein said locking member is structured to engage said camming lever to prevent further pivoting of said camming lever when said camming lever is disposed in said locking position and said first portion is moved in said first direction.

7. A dry break coupling assembly for interconnecting and controlling fluid flow between first and second components in a fluid handling system, the coupling assembly comprising:

a first valve attachable to the first fluid handling system component, said first valve including:

a body including a valve connection end, said body further comprising a fluid passageway;

a valve element rotatably supported within said body, said valve element rotatable between an open position and a closed position;

a handle operatively connected to said valve element for selectively rotating said valve element between said open position, wherein said fluid passageway is opened, and said closed position, wherein said fluid passageway is closed; and at least one camming lever pivotally mounted to said body, said camming lever pivotable between a release position and a locking position;

a second valve attachable to the second fluid handling system component, said second valve including:

a body including a valve connection end, said body further comprising a fluid passageway;

a valve element rotatably supported within said body, said valve element rotatable between an open position and a closed position;

a handle operatively connected to said valve element for selectively rotating said valve element between said open position, wherein said fluid passageway is opened, and said closed position, wherein said fluid passageway is closed; and at least one locking component disposed on said body for cooperating with said camming lever;

wherein said first valve and said second valve are movable relative to each other between a disconnected arrangement and a connected arrangement, wherein said valve connection ends of said first and second valves are disposed in facing relationship when said first valve and said second valve are disposed in said connected arrangement;

wherein said valve element of one of said first and second valves includes a recess arranged to face said valve element of the other of said first and second valves when said first and second valves are positioned in said connected arrangement and said valve element of said one of said first and second valves is disposed in said closed position, wherein rotation of said valve element of one of said first and second valves from said closed position rotates said recess out of facing relationship with said valve element of the other of said first and second valves;

wherein said valve element of said other of said first and second valves includes a portion conforming to the shape of said valve element recess that nests within said valve element recess when said first and second valves are positioned in said connected arrangement and said valve elements of said first and second valves are disposed in said closed positions;

said camming lever and said locking component being complementarily structured and arranged such that said camming lever engages said locking component when said first and second valves are positioned in said connected arrangement and said camming lever pivots from said release position to said locking position, whereby said first and second valves are locked together in said connected arrangement and permit fluid flow therethrough when said valve elements of said first and second valves are disposed in their open positions; and said first valve further comprising a yoke assembly mounted on said body for locking said camming lever in said locking position when said valve element of said first valve is rotated from said closed position to said open position, wherein said yoke assembly comprises a first portion structured to operatively engage and be moved in a first direction by said first valve handle when said valve element of said first valve is rotated from said closed position to said open position, and wherein said yoke assembly comprises a locking member movable in concert with said first portion, wherein said locking member is structured to engage said camming lever to prevent further pivoting of said camming lever when said camming lever is disposed in said locking position and said first portion is moved in said first direction.

8. The dry break coupling assembly of claim 7 wherein said at least one camming lever comprises first and second camming levers disposed on opposite sides of said first valve body, and wherein said yoke assembly comprises a generally C-shaped yoke with locking members on either end for separately engaging said first and second camming levers.

9. The dry break coupling assembly of claim 7 wherein said locking member comprises a pin, and wherein said camming lever includes a locking recess into which said pin inserts when said camming lever is disposed in said locking position and said pin is moved in said first direction.

10. The dry break coupling assembly of claim 9 wherein said yoke assembly further comprises means for biasing said yoke assembly in a direction opposite said first direction when said first portion disengages said first valve handle as said valve element of said first valve is rotated from said open position to said closed position.

11. The dry break coupling assembly of claim 7 wherein said first valve handle comprises a recess, wherein said second valve handle interlocks with said first valve handle within said recess when said first and second valves are positioned in said connected arrangement and said valve elements of said first and second valves are disposed in their open positions, and wherein said recess is structured to require rotating said second valve handle such that said valve element of said second valve rotates from said open position toward said closed position prior to rotating said first valve handle such that said valve element of said first valve rotates from said open position toward said closed position.

12. The dry break coupling assembly of claim 11 wherein said second valve handle comprises a recess, wherein said first valve handle interlocks with said second valve handle within said second valve handle recess when said first and second valves are positioned in said connected arrangement and said valve elements of said first and second valves are disposed in their closed positions, and wherein said second valve handle recess is structured to require rotating said first valve handle such that said valve element of said first valve rotates from said closed position toward said open position prior to rotating said second valve handle such that said valve element of said second valve rotates from said closed position toward said open position.

13. A coupling assembly for interconnecting and controlling fluid flow between first and second components in a fluid handling system, the coupling assembly comprising:

a first valve attachable to the first fluid handling system component, and a second valve attachable to the second fluid handling system and connectable to said first valve;

wherein each of said first and second valves comprises:

a body including a fluid passageway and a valve connection end;

a valve element rotatably supported within said body and rotatable between a closed position closing said fluid passageway and an open position opening said fluid passageway, wherein at least a majority portion of said valve element is located in a rearward direction from its respective valve connection end; and a handle operatively connected to said valve element for selectively rotating said valve element between said open position and said closed position, wherein said handle is disposed in a first position when said valve element is arranged in said closed position and a second position when said valve element is arranged in said open position;

wherein at least one of said first and second valves comprises an automatic locking assembly for preventing rotation of its respective handle from said first position toward said second position when said first and second valves are disconnected and permitting rotation of its respective handle from said first position toward said second position when said first and second valves are connected, said locking assembly comprising:

a locking component slidably disposed relative to said body and movable between a forward position and a rearward position;

a biasing element for biasing said locking component toward said forward position when said first and second valves are disconnected;

wherein said locking component is complementarily configured with the other of said at least one of said first and second valves to be engaged thereby during connection of said first and second valves such that said locking component is forced rearwardly to said rearward position during valve connection;

a handle engaging member connected to said locking component; and a recess formed in said handle;

wherein said handle engaging member is structured and arranged to be in abutting contact with a portion of said handle arranged in said first position when said locking component is disposed in said forward position such that rotation of said handle relative to said locking component is prevented; and wherein said handle engaging member is aligned with said handle recess when said locking component is disposed in said rearward position such that said handle may rotate from said first position toward said second position as said handle engaging member slides within said recess.

14. The coupling assembly of claim 13 wherein each of said first and second valves comprises an automatic locking assembly, and wherein said locking components of said first and second valves engage each other during connection of said first and second valves.

15. The coupling assembly of claim 13 wherein said locking component comprises a locking button received within a body cavity and projecting forward of said valve connection end.

16. The coupling assembly of claim 13 wherein said handle engaging member comprises an arcuate ridge.

17. The coupling assembly of claim 13 wherein said handle comprises a handle head including an underside facing said valve body, and wherein said recess is formed into said handle underside and comprises an arcuate groove.

18. A dry break coupling assembly for use with first and second components of a fluid handling system, said coupling assembly comprising:

a first valve attachable to the first fluid handling system component, said first valve including a body with a fluid passageway therethrough, a rotatable valve element disposed within said body for opening and closing said fluid passageway, and handle means for selectively rotating said valve element;

a second valve attachable to the second fluid handling system component, said second valve including a body with a fluid passageway therethrough, a rotatable valve element disposed within said body for opening and closing said fluid passageway, and handle means for selectively rotating said valve element;

wherein said first valve and said second valve further comprise means for locking together said first valve and said second valve when arranged in a connected relationship, wherein said locking means comprises at least one pivotable camming lever;

wherein said valve elements of said first and second valves are cooperatively structured and arranged such that a portion of one valve element projects into and conforms to a recess formed in the other valve element when said first and second valves are arranged in said connected relationship and said handle means of said first and second valves are arranged such that both said valve elements are oriented to close their respective fluid passageways, whereby a dry disconnect is provided; and means, cooperating with said first valve handle means, for preventing pivoting of said camming lever when said first and second valves are locked together and said rotatable valve element of said first valve is arranged to open said fluid passageway, whereby disconnection of said first valve and said second valve when said first valve is opened is prevented.

19. The dry break coupling assembly of claim 18 wherein said handle means of said first and second valves comprise recess means for sequencing rotation of said handle means during opening and closing of said valve elements of said first and second valves, wherein said recess means requires said first handle means to be rotated prior to said second handle means during opening of respective said valve elements, and wherein said recess means requires said second handle means to be rotated prior to said first handle means during closing of respective said valve elements.

20. A dry break coupling assembly for use with first and second components of a fluid handling system, said coupling assembly comprising:

a first valve attachable to the first fluid handling system component, said first valve including a body with a fluid passageway therethrough, a rotatable valve element disposed within said body for opening and closing said fluid passageway, and handle means for selectively rotating said valve element;

a second valve attachable to the second fluid handling system component, said second valve including a body with a fluid passageway therethrough, a rotatable valve element disposed within said body for opening and closing said fluid passageway, and handle means for selectively rotating said valve element;

wherein said first valve and said second valve further comprise means for locking together said first valve and said second valve when arranged in a connected relationship, wherein said locking means comprises at least one pivotable camming lever;

wherein said valve elements of said first and second valves are cooperatively structured and arranged such that a portion of one valve element projects into and conforms to a recess formed in the other valve element when said first and second valves are arranged in said connected relationship and said handle means of said first and second valves are arranged such that both said valve elements are oriented to close their respective fluid passageways, whereby a dry disconnect is provided; and wherein each of said first and second valves further comprises means for preventing rotation of their respective valve elements from an arrangement closing the fluid passageway to an arrangement opening the fluid passageway when said first and second valves are disconnected, said rotation preventing means of each of said first and second valves structured and arranged for deactivation by operative engagement with the other of said first and second valves when said first and second valves are locked together in said connected arrangement, whereby upon deactivation said rotation preventing means allow rotation of their respective valve elements from said closed position to said open position.

* * * * *